June 17, 1924.

S. O. HULETT 1,498,279

DIFFERENTIAL

Filed March 9, 1923

S. O. Hulett
INVENTOR

BY Victor J. Evans
ATTORNEY

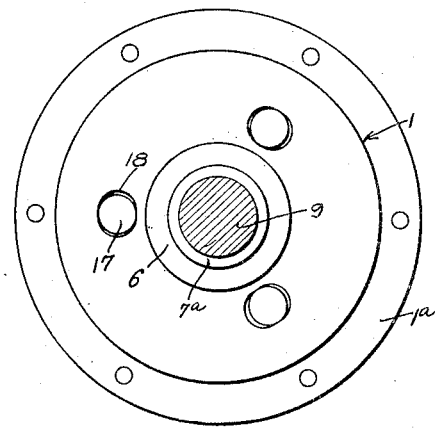
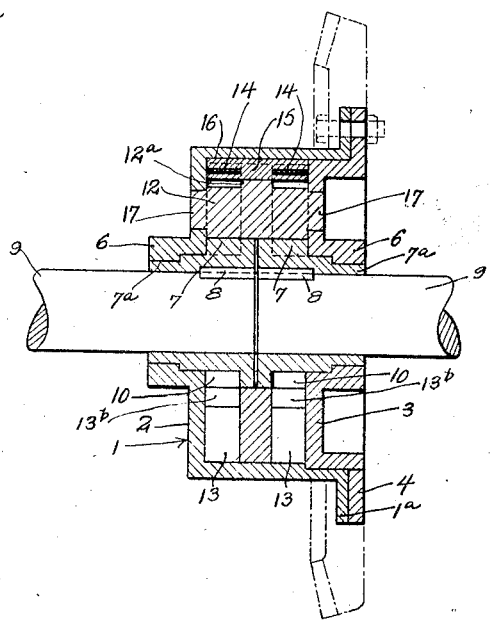
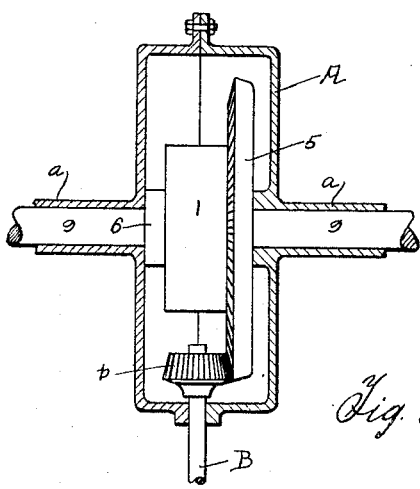

Patented June 17, 1924.

1,498,279

UNITED STATES PATENT OFFICE.

SNOE O. HULETT, OF CORRY, PENNSYLVANIA.

DIFFERENTIAL.

Application filed March 9, 1923. Serial No. 623,962.

*To all whom it may concern:*

Be it known that I, SNOE O. HULETT, a citizen of the United States, residing at Corry, in the county of Erie and State of Pennsylvania, have invented new and useful Improvements in Differentials, of which the following is a specification.

This invention relates to differentials, and more particularly to a differential specially adapted for use in connection with automobiles.

One of the main objects of the invention is to provide a differential of simple construction and operation which may be readily produced at small cost and is well adapted for use in connection with the Ford automobile. A further object is to provide a differential which consists of a minimum number of parts and may be readily assembled or disassembled and which possesses great strength. Further objects will appear from the detailed description.

In the drawings:—

Figure 3 is an end view of the differential;

Figure 4 is a section taken substantially on line 4—4 of Fig. 2;

Figure 5 is a plan view of the differential as applied.

Figure 1:
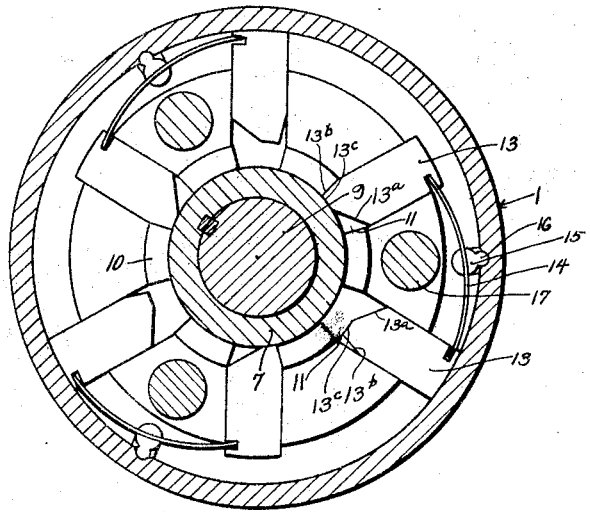
Figure 1 is a transverse section taken through the differential adjacent to one end thereof.

This invention is intended as a simplification and improvement on the differential disclosed in my U. S. application for differential filed October 11, 1921, Serial Number 506,966, and Serial Number 596,413, filed Oct. 23, 1922; one of the main objects being to produce a differential of very simple construction and operation and which possesses great strength. In the present differential I provide a casing 1 closed at one end by a head 2 and, at its other end, by a head plate 3 which plate is provided with an outer annular flange 4 which is secured by bolts, or in any other suitable or preferred manner, to flange 1ª of casing 1, these bolts also serving to secure gear ring 5 to the casing. Head 2 and head plate 3 are each provided with a bearing sleeve 6 which receives neck 7ª of a wheel 7 secured by a key 8, or in any other suitable or preferred manner, on the inner end of rear axle 9 of the automobile. Each wheel 7 is provided with a plurality of radiating projections 10, the spaces between these projections being normally in alignment with grooves 11 provided in the opposite sides of a transmission disc 12 mounted within casing 1. Dogs 13 are slidably mounted in grooves 11 of disc 12 for engagement between projections 10 of the wheels 7. These dogs are arranged in pairs the dogs of each pair being loosely connected, at their outer ends, to a bowed leaf spring 14 which is secured in one end of the body of a rocker 15 rockably mounted in the reduced peripheral portion 12ª of disc 12. This rocker is provided with a rounded head 16 which fits into a corresponding recess provided in the inner face of casing 1. When the casing is rocked in either direction relative to disc 12 the rockers 15 will be turned so as to project one of the dogs 13 and retract the other dog, corresponding dogs of each pair of the dogs being projected and retracted. This will be clear from Figs. 1 and 2.

Disc 12 is provided, at each side, with a plurality of lugs 17, which lugs project through openings 18 of elliptical shape provided through head 2 and head plate 3 of the casing. This permits independent turning movement of casing 1 about disc 12 for a predetermined distance in either direction, after which the end walls of openings 18 contact with lugs 17 thus establishing a positive driving connection between the casing and the disc so as to cause the latter to rotate with the former. This slight independent turning movement of casing 1 is sufficient to rock the rockers 15 so as to project one dog of each set or pair and retract the other dog thus automatically setting the differential to drive in the direction which it is desired to drive in.

Figure 2:
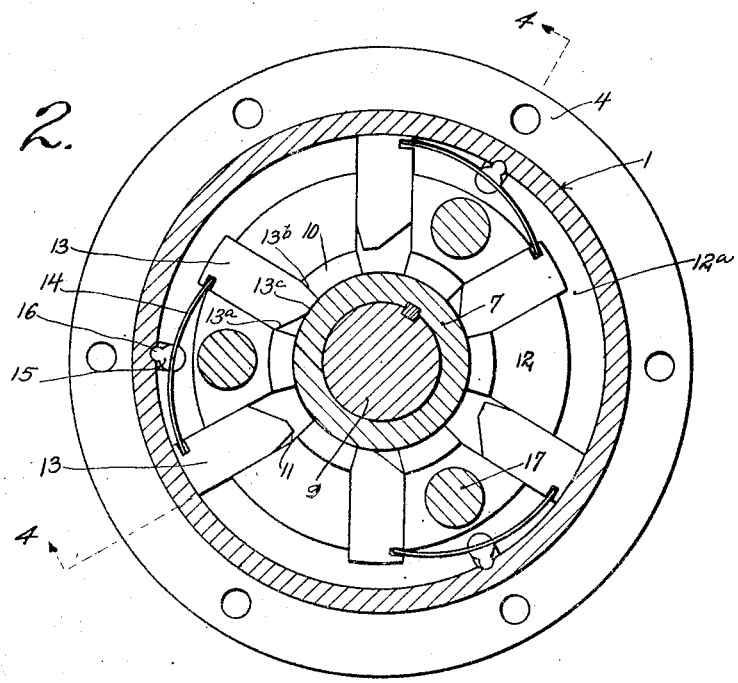
Figure 2 is a transverse section taken through the differential adjacent to the other end thereof.

The inner end of each dog 13 is provided with a relatively long beveled face 13ª and a short inclined face 13ᵇ connected by an inner end portion 13ᶜ. As will be noted from Figs. 1 and 2, the dogs of each pair are reversely related. Referring to Fig. 2, it is assumed in this figure that the casing 1 is being rotated or driven in a clockwise direction. In this case the right hand dog of each pair, as considered in this figure, is projected so as to engage between two of the projections 10 of wheel 7. When it is necessary for one of the wheels to run faster than the other wheel, as when making a turn, this is permitted by the beveled faces 13ᵃ of the projected dogs 13. As will be clear from Fig. 2, if it is necessary for wheel 7 to overrun disc 12, projections 10 of the wheel will strike the beveled faces 13ᵃ of the dogs thus lifting the dogs which are returned to projected position by springs 14. After the turn has been completed the dogs 13 engage between projections 10 and the wheel 7 is driven with disc 12 in the manner previously described. This permits either of the axles to rotate at greater speed than the casing 1 and associated parts, when necessary and insures a positive drive for both axles so that in the event of one of the rear wheels of the automobile being in a mud hole, the other wheel being on solid ground, the automobile can readily pull itself out. Again referring to Fig. 2, in which it is assumed that the casing 1 and associated parts are being driven in a clockwise direction, if it is desired to reverse the drive, this is readily accomplished by reversing the direction of rotation of casing 1. When the direction of rotation of the casing is initially reversed, rockers 15 will be turned so as to retract the right hand dog of each pair as considered in this figure, and project the left hand dog, after which the end walls of openings 18 will contact with lugs 17 thus rotating disc 12 in the reverse direction with casing 1, consequently reversing the direction of drive of axles 9.

This differential consists of a minimum number of parts and, because of its compact construction, is well adapted for use in the Ford automobile. In addition, to consisting of a minimum number of parts it possesses great strength, which are very valuable features in a differential. The differential is applied in a known manner being enclosed in a differential housing A from which extend rear axle housings a. Drive shaft B is rotatably mounted through housing A and an opening b is secured on this shaft and meshes with gear ring 5 secured to casing 1 in the manner described.

While my differential is particularly well adapted for use in the Ford automobile, I do not in any way limit myself to this one use, since it can be equally well applied to many other automobiles of various makes.

What I claim is:—

1. In a differential, a casing, a disc within the casing, means for connecting the disc to the casing for rotation therewith, said means permitting limited independent rotary movement of the casing in either direction, sleeves mounted in the casing, and provided with spaced projections, dogs slidably mounted in the disc and disposed to be moved into and out of engagement with the projections of the sleeves, said dogs being arranged in pairs and the inner ends of the dogs of each pair being oppositely beveled, and means actuated by the independent movement of the casing for projecting one of the dogs of each pair and retracting the other dog, corresponding dogs of the respective pairs being similarly operated.

2. In a differential, a casing, a disc within the casing, means for connecting the disc to the casing for rotation therewith, said means permitting limited independent rotary movement of the casing in either direction, sleeves mounted in the casing, and provided with spaced projections, dogs slidably mounted in the opposite sides of the disc and disposed to be moved into and out of engagement with the projections of the sleeves, said dogs being arranged in pairs and the inner ends of the dogs of each pair being oppositely beveled, and means actuated by the independent movement of the casing for projecting one of the dogs of each pair and retracting the other dog, corresponding dogs of the respective pairs being similarly operated.

3. In a differential, a casing, a disc within the casing, dogs slidably mounted in the opposite sides of the disc for movement radially thereof, said dogs being arranged in pairs and the inner ends of the dogs of each pair being oppositely beveled, sleeves mounted in the casing concentric with the disc and provided with radiating projections disposed in the planes of the respective sets of dogs at the sides of the discs, means for establishing driving connections between the casing and the disc, said means permitting independent turning movement of the casing a predetermined distance in either direction, and means actuated by the independent turning movement of the casing for projecting one dog and retracting the other dog of each pair of dogs, corresponding dogs of the respective pairs being similarly operated, the dog operating means permitting outward movement of the projected dogs upon outward pressure being applied to the inner ends thereof.

4. In a differential, a casing, a disc within the casing, dogs slidably mounted in the opposite sides of the disc for movement radially thereof, said dogs being arranged in pairs and the inner ends of the dogs of each pair being oppositely beveled, sleeves mounted in the casing concentric with the disc and provided with radiating projections disposed in the planes of the respective sets of dogs at the sides of the discs, means for establishing driving connections between the casing and the disc, said means permitting independent turning movement of the casing a predetermined distance in either direction, rocker members rockably mounted in the disc, resilient dog operating members secured to said rockers and projecting beyond the opposite sides thereof, each of said operating members having its ends loosely connected to the outer ends of the dogs of the respective pairs of dogs, and connections between the rockers and the casing for rocking the former in accordance with the independent turning movement of the latter.

5. In a differential, a casing, sleeves rotatably mounted in the casing and provided on their inner ends with radial projections, a disc mounted within the casing and extending about the inner portions of the sleeves, means for connecting the disc to the casing for rotation therewith, said means permitting independent turning movement of the casing about the disc a predetermined distance in either direction, said disc being provided in its opposite faces with radially extending grooves, dogs slidably mounted in said grooves and arranged in pairs, the inner ends of the dogs of each pair being oppositely beveled, rocker members rockably mounted in the disc and connected to the casing to be rocked in accordance with the independent movement thereof, said members being disposed between the dogs of the respective pairs of dogs, and leaf springs carried by the rocker members having engagement with the dogs for projecting one dog and retracting the other dog of each pair in accordance with rocking of said rocker members.

In testimony whereof I affix my signature.

SNOE O. HULETT.